(12) United States Patent
Kay (10) Patent No.: US 6,206,800 B1
(45) Date of Patent: Mar. 27, 2001

(54) UNIVERSALLY ADAPTABLE CARRIER AND SWING ARM FOR PLANETARY GEAR ASSEMBLY

(75) Inventor: Steven D. Kay, Greenlawn, NY (US)

(73) Assignee: Thomson Industries, Inc., Fort Washington, NY (US)

( * ) Notice: Subject to any disclaimer, the term of this patent is extended or adjusted under 35 U.S.C. 154(b) by 0 days.

(21) Appl. No.: 09/378,038

(22) Filed: Aug. 20, 1999

Related U.S. Application Data (60) Provisional application No. 60/097,461, filed on Aug. 21, 1998.

(51) Int. Cl.⁷ ................................................. F16H 57/08
(52) U.S. Cl. ............................................................. 475/346
(58) Field of Search .................................. 475/346, 331

(56) References Cited

U.S. PATENT DOCUMENTS

| | | |
|---|---|---|
| 1,770,408 | 7/1930 | Jacobsen . |
| 1,981,582 | 11/1934 | Colucci . |
| 2,893,268 * | 7/1959 | Liebel ................................... 475/346 |
| 3,315,547 * | 4/1967 | Fritsch ................................. 475/346 |
| 3,364,761 | 1/1968 | Nasvytis . |

(List continued on next page.)

FOREIGN PATENT DOCUMENTS

| | | |
|---|---|---|
| 0 255 571 | 8/1990 | (EP) . |
| 0 239 198 B1 | 9/1991 | (EP) . |
| 0 688 976 | 1/1997 | (EP) . |
| 0 618 383 B1 | 10/1998 | (EP) . |
| 0 189 569 | 12/1989 | (GB) . |
| 2 195 002 | 4/1990 | (GB) . |

OTHER PUBLICATIONS

Drive Train –(An Overview) http://www.innerauto.com/innerauto/text/rivov.html Dec. 16. 1998.
Geat Train pp. 107, 108.
How Gears Work by Marshall Brain htpp://www.howstuffworks.com/gears.htm.
Rotational Kinematics–Physics of Gears htpp://www.kent.wednet.edu/KSD/KR/ScientDept/subjects/physicspages/AP.../physicsof.htm.

*Primary Examiner*—Dirk Wright
(74) *Attorney, Agent, or Firm*—Dilworth & Barrese, LLP (57) ABSTRACT

A gear train assembly which includes a ring gear, a drive gear and at least one planetary gear which revolves about the drive gear within the ring gear. The gear train assembly also includes a universal carrier having a plurality of mechanical interfaces disposed thereon which anchor one end of a stanchion and a universal carrier cover having a complimentary plurality of mechanical interfaces which anchor the other end of the stanchion. A pivot assembly with a bushing mounts the planetary gear to a swing arm which is coupled to the stanchion. The gear ratio of the gear train can be selectively manipulated simply by changing the size and location of the gears which, in turn, alters the number of stanchions and the size and location of the pivot assemblies. In this manner, the same carrier and carrier cover plate can be used with multiple gear ratios.

16 Claims, 5 Drawing Sheets

U.S. PATENT DOCUMENTS

| | | |
|---|---|---|
| 3,780,601 | 12/1973 | Dach et al. . |
| 3,939,736 | 2/1976 | Morin . |
| 3,943,780 | 3/1976 | Klaue . |
| 3,990,328 | 11/1976 | Galbraith . |
| 4,043,210 * | 8/1977 | Updegrave ............................ 475/346 |
| 4,098,146 | 7/1978 | McLarty . |
| 4,158,317 | 6/1979 | James . |
| 4,158,967 * | 6/1979 | Vatterott ............................... 475/346 |
| 4,380,274 | 4/1983 | Abraham et al. . |
| 4,411,172 | 10/1983 | Demarco . |
| 4,424,726 | 1/1984 | Galbraith . |
| 4,435,998 | 3/1984 | Kinoshita . |
| 4,530,331 | 7/1985 | Gibson et al. . |
| 4,721,014 | 1/1988 | Ohkubo . |
| 4,838,123 | 6/1989 | Matoba . |
| 5,071,394 | 12/1991 | Lester . |
| 5,284,068 | 2/1994 | Frost . |
| 5,302,160 | 4/1994 | Fujika . |
| 5,368,528 | 11/1994 | Farrell . |
| 5,370,590 | 12/1994 | Premiski et al. . |
| 5,429,558 | 7/1995 | Lagarde . |
| 5,433,674 | 7/1995 | Sheridan et al. . |
| 5,480,362 | 1/1996 | Tanaka et al. . |
| 5,498,208 | 3/1996 | Braun . |
| 5,509,865 | 4/1996 | Hall, III. . |
| 5,514,043 | 5/1996 | Antonov . |
| 5,545,100 | 8/1996 | Roovers et al. . |
| 5,558,593 | 9/1996 | Roder et al. . |
| 5,593,362 | 1/1997 | Mizuta . |
| 5,662,545 | 9/1997 | Zimmerman et al. . |
| 5,800,302 | 9/1998 | Were . |
| 5,842,947 | 12/1998 | Weilant . |

\* cited by examiner

UNIVERSALLY ADAPTABLE CARRIER AND SWING ARM FOR PLANETARY GEAR ASSEMBLY

This application claims benefit of Provisional No. 60/097,461 filed Aug. 21, 1998.

BACKGROUND

The present disclosure relates to gears and planetary gear assemblies for use in connection with drive shafts. More particularly, the present disclosure relates to a gear train assembly having a universally adaptable carrier and a swing arm assembly which allow for multiple gear ratios simply by varying the size and position of the planetary and sun gears.

TECHNICAL FIELD

There are a variety of machine elements available for transmitting power from one driveshaft to another; one such machine element is a gear. Among the many types of gears, the most common are spur gears, helical gears, bevel gears and worm gears. When two gears mesh, the shape or profile of the teeth of each gear must be such that the common normal at point of contact between two teeth always passes through a fixed point, e.g., pitch point, on the line of centers. This is known as the fundamental law of gearing as described in *Kinematics and Dynamics of Machinery* by C. E. Wilson, J. P. Sadler and W. P. Mitchels.

Gears may be assembled in a wide variety of arrangements which can be generally classified into three main categories: 1) gears fixed on an axis, e.g., simple gear trains where each shaft rotates about a fixed axis, compound gear trains where two or more gears are keyed to the same shaft and reverted gear trains where the input and output gears of a compound train are coaxial; 2) epicyclic gear trains where the center of the outer or planet gear moves about the center of the center or sun gear while the angular velocities of both gears maintain a fixed ratio; and 3) planetary gear trains where two or more independent coaxial gears are meshed commonly with a number of similar, equally spaced gears or planets mounted on intermediate or secondary shafts which are, in turn, fixed to a common carrier.

Due to their simplicity, planetary gear trains are readily adapted to automatic control and are designed to change ratios simply by using electrically or hydraulically operated band breaks (or other breaking mechanism) to keep one or more of the gears stationary. Other planetary trains operating with fixed gear ratios are selected for their compact design and high efficiency.

The simple planetary gear train consists of a sun gear in the center, at least one planet gear, a planet carrier and an internal ring gear. Generally, the sun gear, ring gear and planet carrier all rotate about the same axis and the planet gear (or gears) is mounted on a shaft that turns in a bearing mounted to the planet carrier, i.e., the planet gear meshes with both the sun gear and the ring gear. Additional planet gears positioned about a sun gear are kinematically redundant in terms of speed and velocity, i.e., they play no role in kinematic analysis and simply share the load and give better balance to the overall gear assembly. However, it is known that better balancing of gear tooth loads and inertia forces will result if two or more planets mesh with each ring gear.

In most cases, planetary gear trains are used to obtain a speed increase or speed reduction. For example, if a sun gear rotates with the input shaft and the carrier rotates the output shaft of a planetary gear assembly, the gear assembly would typically operate as a speed reducer. Other applications include a reversal in direction and a differential effect.

Numerous planetary gearing assemblies have been proposed in the past for various applications. However, none of these gear assemblies are designed with a universally adaptable carrier and a swing arm assembly which allow for multiple gear ratios simply by varying the size of the planetary and sun gears. For example: U.S. Pat. No. 5,800,302 to Werre; U.S. Pat. No. 5,842,947 to Weilant; U.S. Pat. No. 5,662,545 to Zimmerman et al.; U.S. Pat. No. 5,498,208 to Braun; and U.S. Pat. No. 5,429,558 to Lagarde, all relate to types of planetary gearing assemblies for use with various devices, e.g., transmissions, screw drivers and/or sprinklers. For the most part, the prior art devices are overly complicated, difficult to assemble and require re-tooling in order to change gear ratios.

Thus, there exists a need to develop a gear assembly in which the gear ratios can be modified in a simple, quick and effective manner without the need for retooling, changing carriers or remounting the input and/or output shafts.

SUMMARY

The present disclosure relates to a gear train assembly which includes an outer ring gear, a first gear or drive gear and at least one planetary or second gear which revolves about the first gear within the ring gear. The gear train assembly also includes a universal carrier having a plurality of mechanical interfaces, e.g., apertures or bushings, disposed thereon which anchor a first end of a support member or stanchion and a universal carrier cover having at least a complimentary plurality of mechanical interfaces disposed thereon which anchor a second end of the stanchion. A pivot assembly with a bushing mounts the second gear to a swing arm which is coupled to the stanchion. Preferably, the gear train assembly also includes a spacer for anchoring a distal end of the bushing to the stanchion.

In one embodiment, the mechanical interfaces of the universal carrier and the carrier cover are positioned so as to accommodate a plurality of pivot assemblies and corresponding stanchions at multiple positions. Preferably, the gear ratio between the first and second gears can be selectively altered without changing the carrier or carrier cover, e.g., by manipulating the size of one of the first gear and/or the ring gear and the size and position of the pivot assemblies and affixing the stanchions to correlating mechanical interfaces on the carrier and the carrier cover.

Another embodiment includes a gear train assembly which has a drive gear, a ring gear and at least one selectively removable planetary gear assembly having a bushing which mounts a planetary gear to a swing arm which is coupled to a fixed stanchion. The gear train assembly also includes a carrier having a plurality of mechanical interfaces disposed thereon which anchor a first end of the stanchion of the planetary gear assembly and a carrier cover having at least a complimentary plurality of mechanical interfaces disposed thereon which anchor a second end of the stanchion of the planetary gear assembly. A plurality of planetary gear assemblies can be mounted between the universal carrier and carrier cover to mesh with the drive gear and the ring gear.

Preferably, the gear ratio between the drive gear and the planetary gear assemblies can be selectively altered by manipulating the size of one of the drive gear and/or the ring gear and the size and position of the planetary gear assemblies. The mechanical interfaces of the carrier and the carrier cover are positioned so as to accommodate multiple planetary gear assemblies in multiple positions.

In another embodiment, the gear train assembly includes a ring gear; a first gear having a first diameter and a plurality of second gears having a second diameter which revolve about the first gear within the ring gear. The gear train also includes a complimentary plurality of pivot assemblies each having a swing arm which couples at one end to one of the second gears and at an opposite end to a fixed stanchion. The swing arm is movable to compensate for manufacturing deviations in the first and second gears and the second gears and the ring gear and/or to compensate for changes in the input-to-output ratio.

DETAILED DESCRIPTION OF THE PREFERRED EMBODIMENTS

The present disclosure relating to the swing arm or swing link is designed to compensate for part deviations (e.g., runout and tooth-to-tooth errors in the sun, planet and ring gear) within the planetary gear assembly and provides the benefit of load sharing between the multiple gear meshes (2, 3, 4, etc.). In addition, runout of bearing support locations for the carrier relative to the ring gear are also compensated for as a result of the fact that the planet gear assumes the optimum radial location from the centerline of the axis of the gearbox. In other words, by allowing the planet to float it assumes an orbital path which balances the load between the sun-planet and the planet-internal mesh. This is simply not the case with a fixed planet design whereby load sharing is achieved as a result of the precision machining of the associated components (one of the most critical being the planet bore locations in the carrier plate and cover plate).

It is know that load sharing between the various meshes in a planetary design is the key element in achieving the maximum torque capacity in a compact package. In a fixed planet design, the planet gears have no freedom of movement in a radial direction. Typically, the means of achieving equal torque through each of the planetary meshes is achieved by precision machining of the gears, (in some cases grinding), the gear housings, support shafts and carrier aperture locations. As can be appreciated by the present disclosure, by allowing the planet gears to float, the equal distribution of torque between meshes is more easily optimized without precision manufacturing. In fact, some of the precision requirements of the gearing and the gear support components can be relaxed as a result of the present disclosure. This reduces the cost of the product.

In addition to load sharing, there are other benefits associated with the invention, e.g., improvement in efficiency, reduced torque ripple and lower noise levels. These all relate to the fact that the planets travel in an optimum orbit around the sun gear, thereby reducing friction and eliminating any interference that would have been apparent had they not had freedom to move in a radial direction.

For example, one of the elements associated with load sharing in a planetary box is the consistency in size of the planet gears. This is normally measured from the bore of the gear by meshing it with a master gear (highest quality) and recording deviations in size and tooth to tooth errors. Total composite error is the sum of the radial runout of the pitch circle of the gear (as measured from the bore) and the tooth to tooth error (variation in tooth form and spacing).

Repeatability of size on a gear can be achieved by accurate machining which is a costly manufacturing process. Another process which has good size repeatability is powdered metal processing which is deployed in the present design. Other, cheaper manufacturing processes may also be employed to achieve adequate repeatability, e.g., injection molding, sintered metal, metal injection molding. The use of a relatively inexpensive repeatability process is important to the present disclosure because it provides a low cost manufacturing process which has adequate repeatability of size and good gear characteristics (pitch circle runout relative to itself) for the purposes of the present disclosure. The downside to these processes is that the gear form and the bore are produced in separate tool halves, therefore registration issues are inherent. The swing link of the present disclosure compensates for radial runout (normally registration of the bore to the pitch and not the pitch line being "oval"). It is contemplated that more accurate machining processes could be employed with the present disclosure, but it has been found that the unique arrangement of the swing links makes more accurate machining processes unnecessary and uneconomical in terms of cost versus gained mechanical advantage.

The present disclosure relating to the universal carrier and swing link as described above also allows various gear ratios to be created while only utilizing one set of holes in the carrier. In other words, the radial characteristics of the swing links compensate for any variation in gear sizes (sun and planet gears) thus allowing the same carrier plate and/or cover to be utilized for various gear rations, e.g., 3:1, 5:1, 10:1, etc. As can be appreciated, boring common holes in the carrier and/or cover plate is cheaper than precision manufacturing the other associated components as mentioned above.

Since in the past, machined carrier planet locations were only optimized by precise mathematical positioning offering no compensation for error in gear pitch line data, component concentricity and ovality, etc., the swing link system of the present disclosure is an improvement over the old system in that it allows the sun gear to planet mesh and the planet gear to internal gear mesh to balance and provide optimum tooth load balance by providing radial freedom of position.

Figure 1:
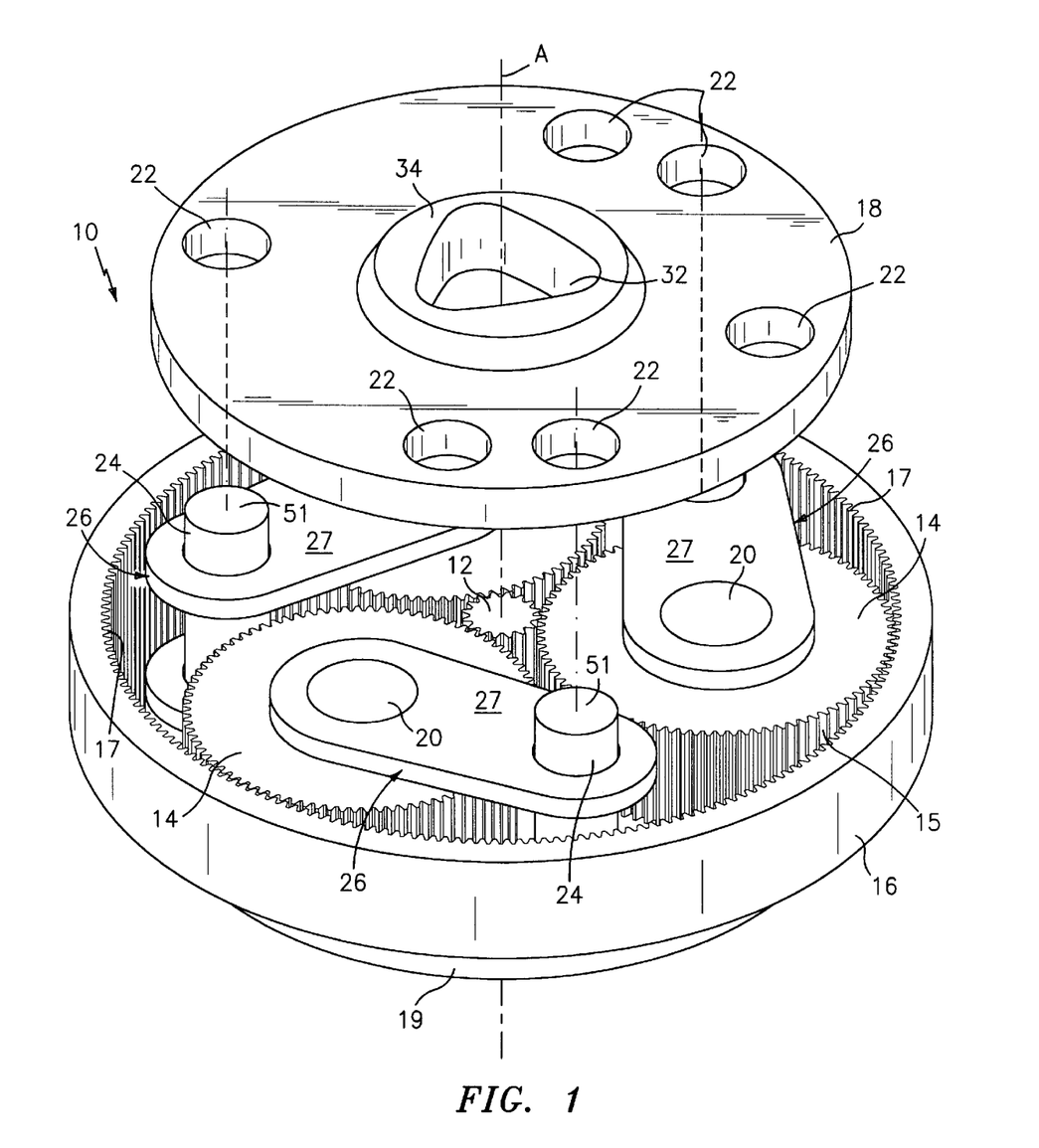
FIG. 1 is a top, perspective view of a gear train assembly according to one embodiment of the present disclosure.

Referring now to FIG. 1A, a gear train assembly 10 includes a drive gear 13, an internal or ring gear 16 and at least one planetary gear 14 meshed therebetween. For the purposes herein the term "mesh" (or variations thereof) is defined as the engagement or working contact of teeth of gears or of a gear and a rack. Preferably, drive gear 13 is affixed to a drive shaft (see FIG. 2) and is axially and planarly aligned within ring gear 16. For the purposes herein, the gear train assembly 10 depicted in the various figure drawings is shown as a speed reducer, i.e., the drive gear 13 rotates with the drive shaft 12 and a universal carrier 18 rotates an output shaft 30, however, it is contemplated that other variations of the assembly 10 can be envisioned to effect a different result, e.g., to increase speed, to reverse direction, and/or to create a differential effect.

Preferably, each gear, e.g., planetary gear 14, drive gear 13 and ring gear 16, includes a plurality of teeth 15, 13 and 17, respectively, which are designed to mesh with one another such that the transmission of motion from one shaft to another is independent of the frictional resistance between the gears and positive motion can be achieved. For the purposes herein, spur gears are shown in the drawings since this is the most common type of gear used for drive trains and manual controls, however, it is envisioned that other gear types can be used to accommodate the same or similar purpose.

Figure 2:
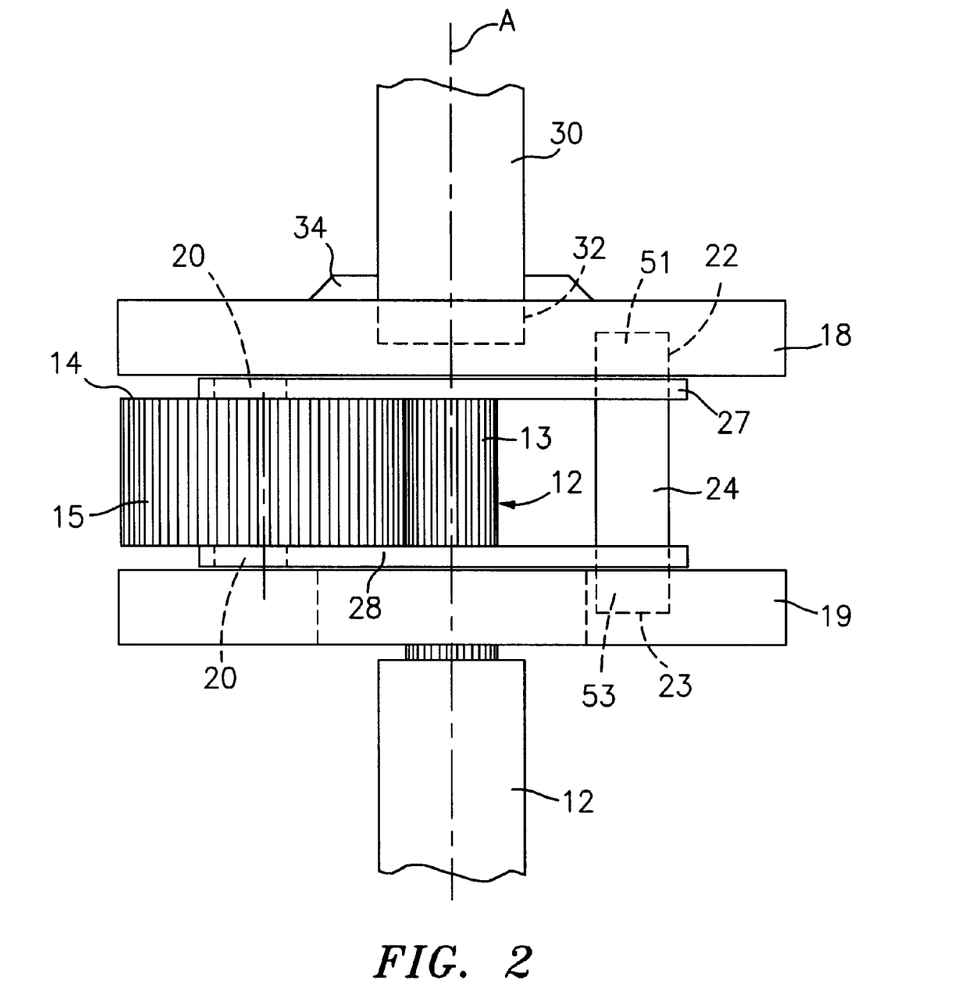
FIG. 2 is an enlarged, fragmentarily-illustrated side view of a planetary gear assembly affixed to a drive shaft and an output shaft.

Gear train assembly 10 also includes universal carrier 18 and a universal carrier cover 19 which each have a plurality of mechanical interfaces, e.g., apertures 22 and 23, respectively, disposed thereon which are each configured and dimensioned to engage an end of a corresponding stanchion 24. Carrier 18 also includes a centrally disposed triangular aperture 32 which is designed to engage output shaft 30 as will be described in more detail below. As best seen in FIGS. 1 and 2, a first end 51 of stanchion 24 engages carrier plate 18 through aperture 22 and a second end 53 of stanchion 24 engages carrier cover 19 through aperture 23. Preferably, a plurality of stanchions 24 are utilized to maintain the carrier 18 and the carrier cover 19 in vertical alignment with one another during rotation.

Figure 3:
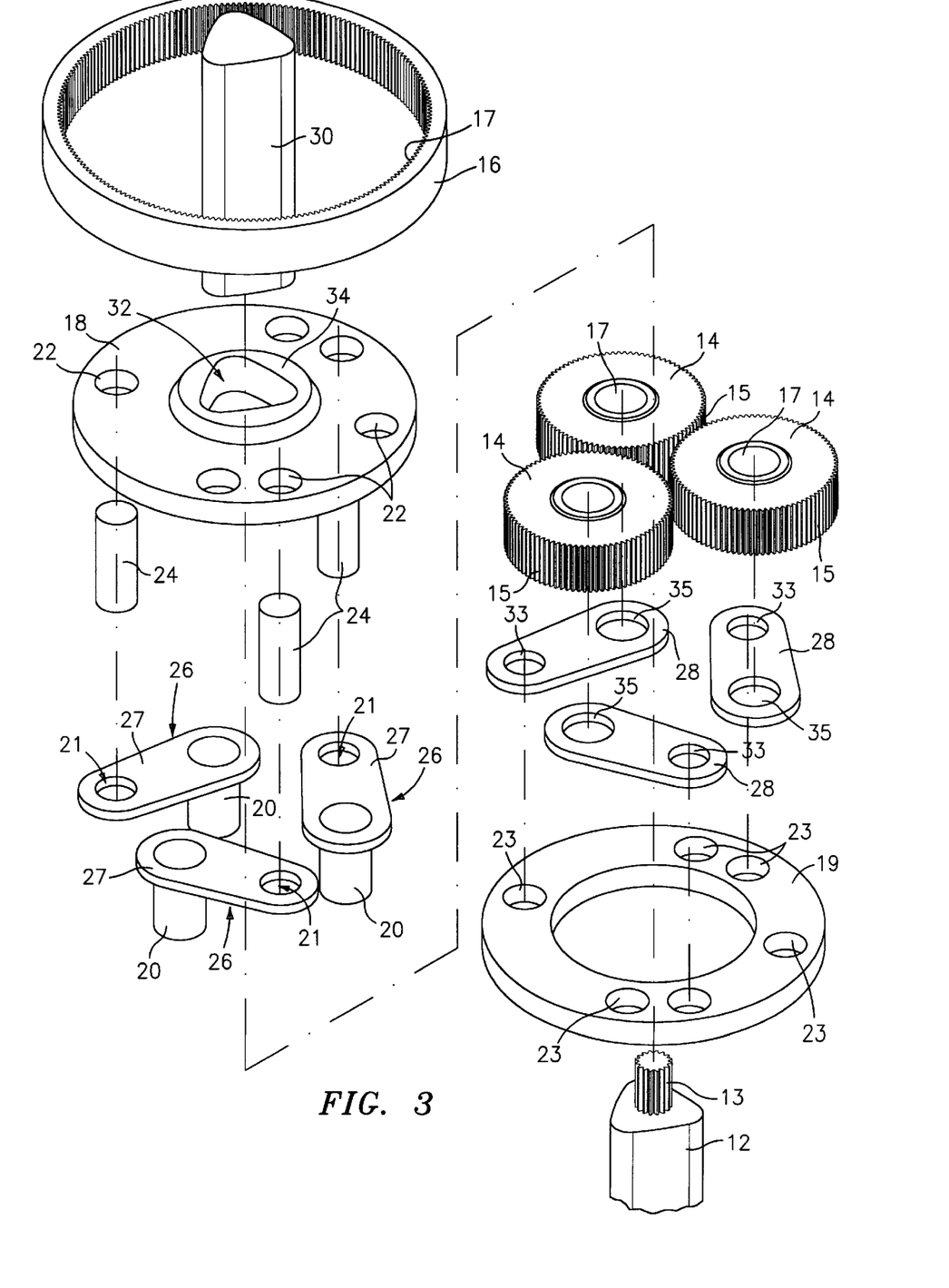
FIG. 3 is an exploded, perspective view of the gear train of FIG. 1.

FIG. 3 shows a pivot assembly 26 which affixes each planetary gear 14 to a particular stanchion 24 and includes a swing arm 27 having at least one mechanical interface, e.g., aperture 21, preferably located at a distal end thereof for engaging stanchion 24. It is envisioned that other mechanical interfaces can be employed to engage stanchion 24, e.g., a bushing or a U-shaped flange. The pivot assembly 26 also includes a shaft 20 which engages planetary gear 14 in a manner which allows planetary gear 14 to freely rotate around shaft 20, e.g., ball bearings. A spacer 28 can also be employed to anchor the distal end of the shaft 20 and secure stanchion 24 within aperture 23 of carrier cover 19. More particularly and as best seen in FIG. 3, spacer 28 includes a recess 35 for securing shaft 20 and an aperture 33 for aligning and securing stanchion 24 within carrier cover 19.

In this manner and once the pivot is assembled, the planetary gear 14, pivot assembly 26 and stanchion 24 (hereinafter defined as a planetary gear assembly 40 when assembled) rotate in unison within the confines of the ring gear 16 upon rotational activation of drive gear 13. In turn, the upper portion of stanchion 24 which is affixed to carrier 18, rotates carrier 18 about a longitudinal axis "A" which, in turn, rotates output shaft 30. Although the addition of multiple planetary gear assemblies 40 is kinematically redundant in terms of speed and velocity, it is preferable to provide multiple planetary assemblies 40 to share the load and give better balance to the overall gear train 10.

Figure 5A:
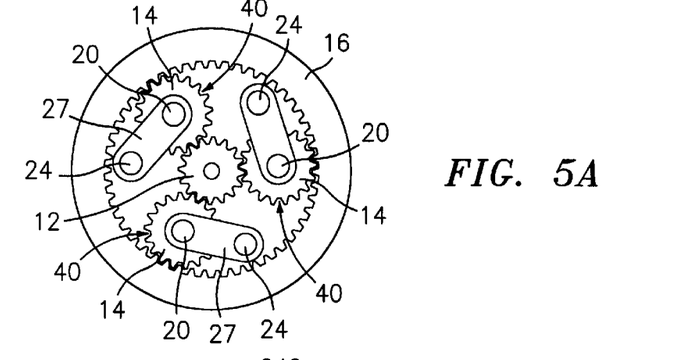
FIG. 5A is top view of FIG. 1 without a universal carrier.

Carrier 18 and carrier cover 19 preferably include a plurality of apertures 22 and 23, respectively, disposed therethrough for engaging stanchions 24 associated with different planetary gear assembly 40 arrangements (i.e., the number of planetary gears). More particularly, FIGS. 3 and 5A show three (3) planetary gear assemblies 40 meshed between drive gear 13 and ring gear 16. In order to change the gear ratio, devices of the past would typically have to re-tool the entire gear train 10 in order to change the gear ratio, i.e., the planetary gears, the drive gear, the ring gear and possibly other associated component parts, e.g., the carrier 18 and carrier cover 19, would have to be changed to affect the gear ratio. Moreover, altering the number of planetary gears to change the load sharing characteristics of the gear train also typically required changing the carrier 18 and carrier cover 19.

Figure 4:
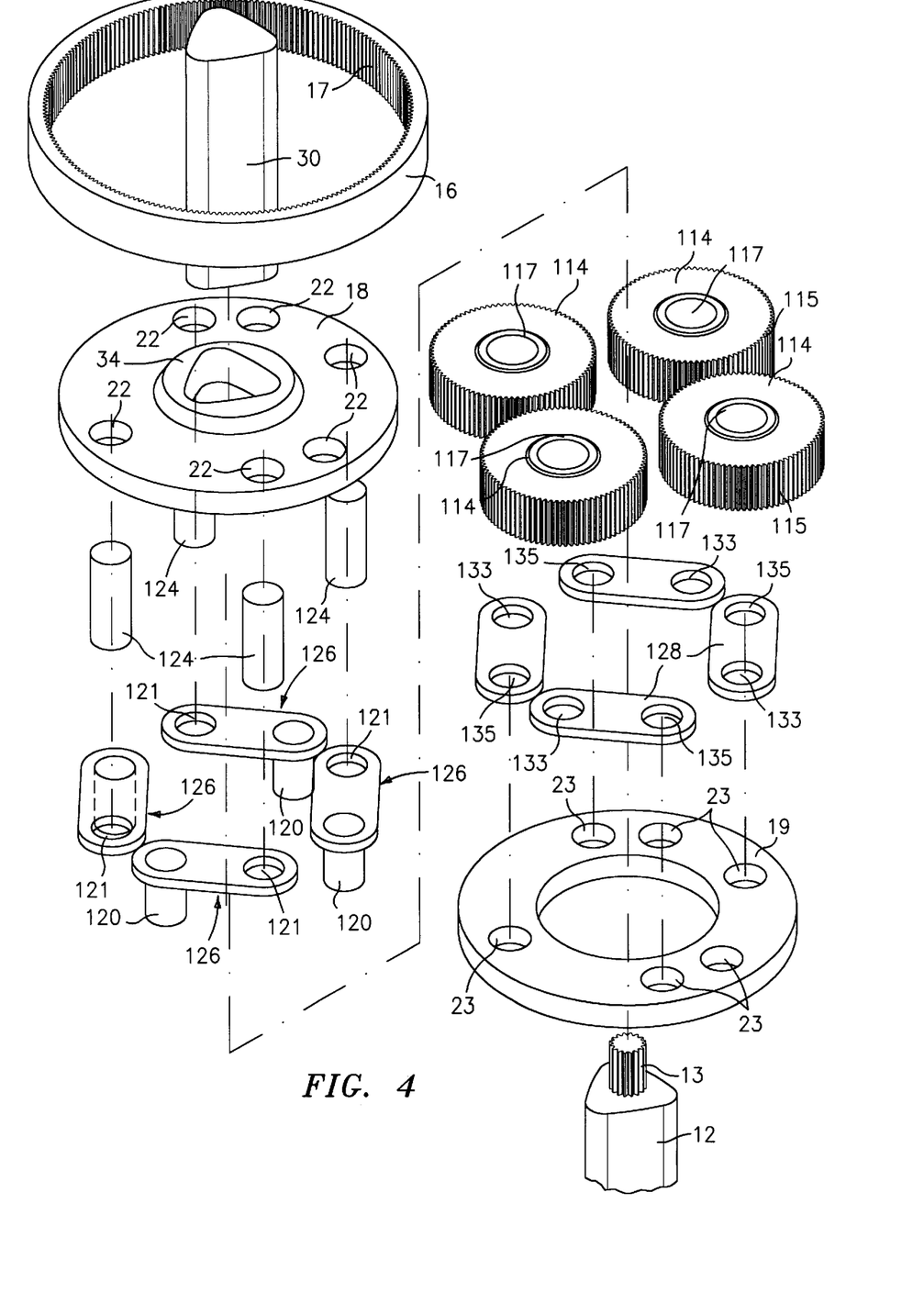
FIG. 4 is an exploded, perspective view of another embodiment of the gear train assembly showing four planetary gear assemblies.
Figure 5B:
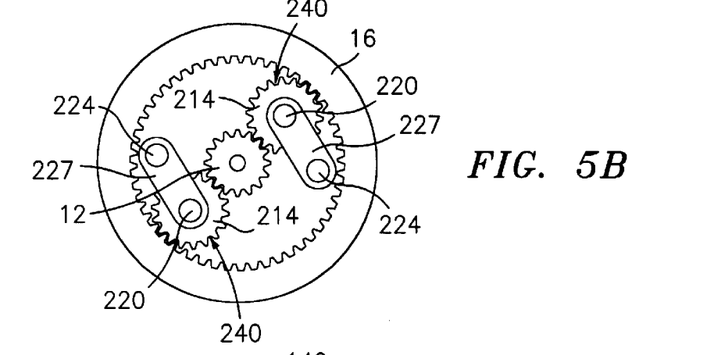
FIG. 5B is a top view of another embodiment of a gear train assembly with two planetary gears without the universal carrier.
Figure 5C:
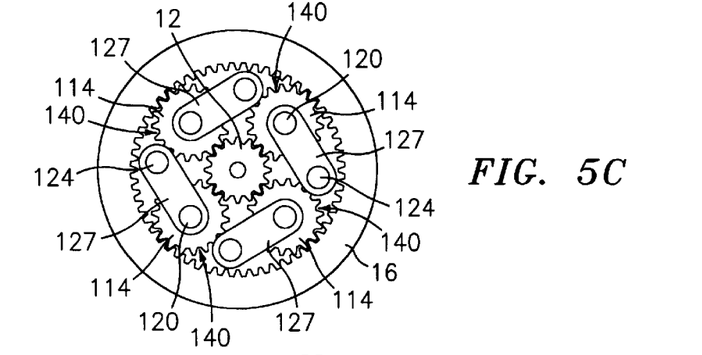
FIG. 5C is a top view of the gear train assembly of FIG. 4 without the universal carrier.
Figure 5D:
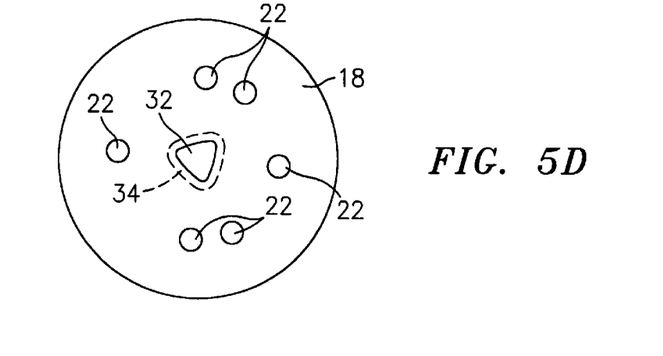
FIG. 5D is a top view of a universal carrier which engages the gear train assemblies of FIGS. 5A–5C.

One aspect of the present disclosure as best seen in FIGS. 4 and 5C, enables four (4) planetary gear assemblies 140 to be positioned between drive gear 13 and ring gear 16 using the same universal carrier 18 and carrier cover 19 as shown with respect to the three (3) planetary gear assembly to provide a different load balance. It is envisioned that any number of planetary gear assemblies can be positioned about a correspondingly-sized drive gear and still effectively engage the universal carrier 18 and carrier cover 19 to turn the output shaft 30. For example, FIG. 5B shows two (2) planetary gear assemblies having two (2) stanchions 224 which are designed to engage corresponding apertures 22 and 23 of the universal carrier 18 and carrier cover 19, respectively. As shown in FIG. 5D, universal carrier 18 and carrier cover 19 can be used for all three (3) gear train assemblies.

As can be appreciated by the present disclosure, the swing arm 127, bushing 117 and stanchion 124 arrangement of the pivot assembly 126 also allow different sized gears 114 to be positioned about the drive gear 13 and still engage the same universal carrier 18 and cover plate 19 to turn output shaft 30. More particularly, the unique aspects of mounting the planetary gears to a fixed stanchion by way of a swing link/arm 27 accommodates a wide variety of different gear ratios without changing the position of the apertures on the universal carrier 18 of carrier cover plate 19, e.g., the swing arm compensates/adjusts for the size of the planet gears relative to the drive gear and/or ring gear while the stanchions 224 stay fixed. In other words, the radial characteristics of the swing links compensate for any variation in gear sizes (sun and planet gears) thus allowing the same carrier plate and/or cover to be utilized for various gear ratios, e.g., 3:1, 5:1, 10:1, etc.

The swing links 27, 127 allow the drive gear 13 to planet gear 14, 114 mesh and the planet gear 14, 114 to internal gear 16 mesh to balance and provide optimum tooth load balance by providing radial freedom of position. Thus, multiple gear ratios can be easily created by simply changing the size of the planetary gear assemblies 40, 140, 240, drive gear 13 and ring gear 16 to create different input-to-output ratios, 3:1, 4:1, 10:1, etc., with out having to change to carrier plate 18 or carrier cover 19. For example, it is known that the input-to-output ration of a gear assembly abides by the following relationship:

$$\text{Ratio} = \left(\frac{\#A}{\#B}\right) + 1$$

where:
A=number of teeth in ring gear 16; and
B=number of teeth in drive gear 13.
Preferably, the planetary gear assemblies 40, 140, 240, drive gear 13, ring gear 16 and swing links can be pre-sized and packaged to quickly and easily change from one input-to-output ratio to another.

From the foregoing and with reference to the various figure drawings, those skilled in the art will appreciate that certain modifications can also be made to the present disclosure without departing from the scope of the present disclosure. For example, although the centrally disposed aperture 32 of carrier 18 is triangular in shape, in some cases it may be preferable to manufacture the aperture 32 with a different shape, e.g., slot-like, key-like, rectangular, spline or polygonal. Moreover, it is envisioned that shaft 30 can engage the apertures 22, 23 of the carrier 18 and carrier cover 19, respectively, by press-fit engagement, shrink-fit engagement (thermal), compression fit or in any other manner known in the trade. Preferably, aperture 32 of carrier 18 (and/or carrier cover 19) projects outwardly from carrier 18 (and/or 19) to form a flange 34 for securing shaft 30.

Although the drawings show the drive gear, ring gear and planetary gears as spur gear, it is not beyond the scope of this disclosure to use compound, helical and/or herringbone to accomplish the same or similar purpose. For example: helical gears may be employed to reduce shock and provide smoother transition from one gear to another and herringbone gears (or double helical gears) may be employed to neutralize the end thrust of each helix.

There have been described and illustrated herein several embodiments of a gear train assembly having a universally adaptable carrier and swing arm which allow for multiple gear ratios simply by varying the size of the planetary and sun gears. While particular embodiments of the disclosure have been described, it is not intended that the disclosure be limited thereto, as it is intended that the disclosure be as broad in scope as the art will allow and that the specification be read likewise. Therefore, the above description should not be construed as limiting, but merely as exemplifications of preferred embodiments. Those skilled in the art will envision other modifications within the scope and spirit of the claims appended hereto.

What is claimed is:

1. A gear train assembly, comprising:
   a ring gear;
   a first gear;
   a plurality of second gears which revolve about said first gear within said ring gear;
   a universal carrier having a plurality of mechanical interfaces disposed thereon which each anchor a first end of a plurality of stanchions;
   a universal carrier cover having at least a complimentary plurality of mechanical interfaces disposed thereon which each anchor a second end of said stanchions; and
   a complimentary plurality of pivot assemblies each having a bushing which mounts one of said second gears and a swing arm which couples to one of said stanchions.

2. A gear train assembly according to claim 1 further comprising a plurality of spacers each for anchoring a distal end of one of said bushings to a corresponding stanchions.

3. A gear train assembly according to claim 1 wherein said plurality of mechanical interfaces on said carrier include apertures.

4. A gear train assembly according to claim 1 wherein said plurality of mechanical interfaces on said carrier include bushings.

5. A gear train assembly according to claim 1 wherein said plurality of mechanical interfaces on said carrier cover include apertures.

6. A gear train assembly according to claim 1 wherein the gear ratio between said first gear and said ring gear can be selectively altered without changing said carrier or carrier cover.

7. A gear train assembly according to claim 6 wherein the gear ratio between said first and second gears can be selectively altered by manipulating the size of one of said first gear and said ring gear and the size and position of said pivot assemblies without changing the position of said stanchions.

8. A gear train assembly according to claim 1 wherein the load balance between said first and second gears and said second gears and said ring gear can be selectively altered by manipulating the number and position of said pivot assemblies and stanchions without changing said universal carrier and universalcarrier cover.

9. A gear train assembly, comprising:
   a drive gear;
   a ring gear;
   a plurality of selectively removable planetary gear assemblies each having a bushing which mounts a planetary gear to a swing arm which is coupled to a fixed stanchion;
   a universal carrier having a plurality of mechanical interfaces disposed thereon which each anchor a first end of said stanchion of one of said planetary gear assemblies; and
   a universal carrier cover having at least a complimentary plurality of mechanical interfaces disposed thereon which each anchor a second end of said stanchion of one of said planetary gear assemblies.

10. A gear train assembly according to claim 9 further comprising a spacer disposed between at least one planetary gear assembly and said carrier cover.

11. A gear train assembly according to claim 10 wherein said spacer is coupled at a first end to said bushing and at a second end to said stanchion.

12. A gear train assembly according to claim 9 wherein the gear ratio between said drive and planetary gear assemblies can be selectively altered by manipulating the size of one of said drive gear and said ring gear and the size and position of said planetary gear assemblies without changing the position of said stanchions.

13. In a universal carrier for a planetary gear train having a drive gear, a ring gear and a plurality of planetary gear assemblies each having a bushing which mounts a planetary gear to a swing arm which is coupled to a fixed stanchion, the improvement comprising a plurality of mechanical interfaces disposed on said universal carrier cover which accommodates differently-sized drive gears and differently-sized planetary gears in multiple positions.

14. A universal carrier cover according to claim 13 wherein the gear ratio between said drive gear and said planetary gear assemblies can be selectively altered by manipulating the size of one of said drive gear and said ring gear and the size, number and position of said planetary gear assemblies.

15. A gear train assembly, comprising:
   a ring gear;
   a first gear having a first diameter;
   a plurality of second gears having a second diameter which revolve about said first gear within said ring gear;
   a complimentary plurality of pivot assemblies each having a swing arm which couples at one end to one of said second gears and at an opposite end to a fixed stanchion, said swing arm being movable to compensate for variations in said first and second gear diameters to affect the gear ratio between said first and ring gear.

16. A method of assembling a planetary gear train comprising the steps of:
   a) providing a ring gear;
      a drive gear;
      a plurality of selectively removable planetary gear assemblies each having a bushing which mounts a planetary gear to a swing arm which is coupled to a fixed stanchion; and
      a universal carrier having a plurality of mechanical interfaces disposed thereon which each anchor a first end of said stanchion of one of said planetary gear assemblies; and
      a universal carrier cover having at least a complimentary plurality of mechanical interfaces disposed thereon which each anchor a second end of said stanchion of one of said planetary gear assemblies;
   b) mounting a plurality of planetary gear assemblies between said ring gear and said drive gear to provide a desired gear ratio; and
   c) coupling each stanchion of said plurality of planetary gear assemblies of said mounting step to a mechanical interface disposed on each of said universal carrier and said universal carrier cover.

* * * * *